(No Model.)

A. B. REEVES.
FEEDER FOR CLOVER HULLERS.

No. 455,886. Patented July 14, 1891.

WITNESSES:
C. N. Lodge
F. J. McGahan

INVENTOR
Alfred B. Reeves
BY H. P. Hood,
ATTORNEY

UNITED STATES PATENT OFFICE.

ALFRED B. REEVES, OF COLUMBUS, INDIANA, ASSIGNOR TO REEVES & CO., OF SAME PLACE.

FEEDER FOR CLOVER-HULLERS.

SPECIFICATION forming part of Letters Patent No. 455,886, dated July 14, 1891.

Application filed March 26, 1891. Serial No. 386,475. (No model.)

*To all whom it may concern:*

Be it known that I, ALFRED B. REEVES, a citizen of the United States, residing at Columbus, in the county of Bartholomew and State of Indiana, have invented a new and useful Improvement in Feeders for Clover-Hullers, of which the following is a specification.

My invention relates to an improved device for automatically feeding clover and like material to a clover-huller.

The object of my improvement is to partially disentangle and straighten out the stalks, so as to present the material to the thrashing-cylinder in a measurably-uniform stream, and thus prevent clogging and imperfect hulling, all as hereinafter fully set forth.

The accompanying drawings illustrate my invention.

Figure 3:
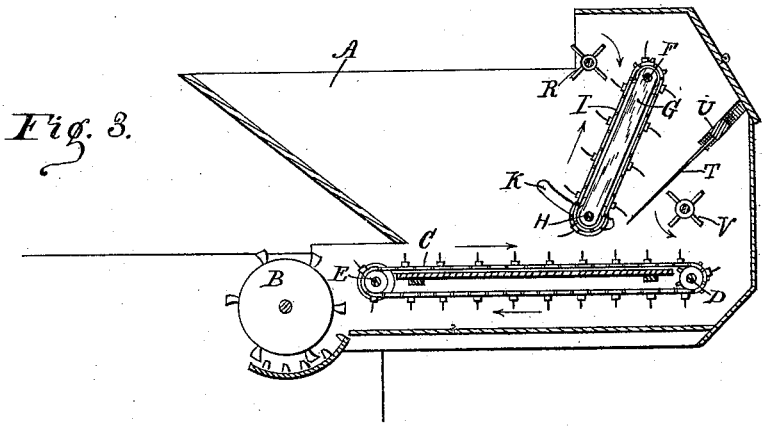
Figure 2:
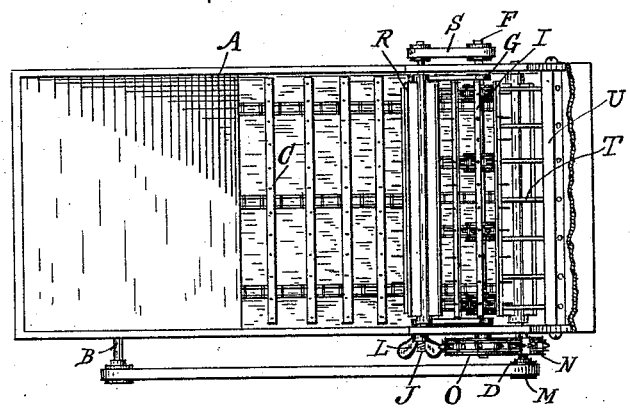
Figure 1:
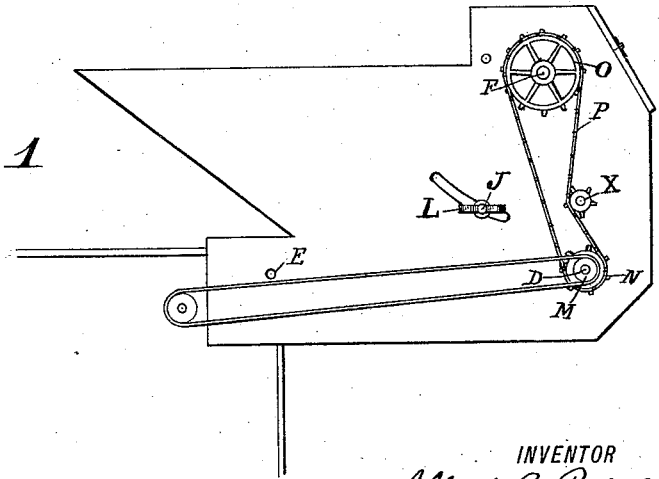

Figure 1 represents a side elevation. Fig. 2 is a plan. Fig. 3 represents a longitudinal section.

A is a hopper adapted to be secured to the throat of a clover-huller.

B is the thrashing-cylinder.

A short distance above the bottom of the hopper A and parallel therewith is a horizontal conveyer-belt C, mounted on shafts D and E. Extending across the upper part of the hopper at one end thereof is the shaft F, from which is suspended a light frame G, having at its free end a shaft H. Mounted on shafts F and H is an inclined conveyer-belt I. The free end of frame G is adjustably secured to the sides of the hopper, preferably by means of a screw-threaded stud J, secured to the frame and projecting therefrom through a slot K in the side of the hopper and provided with a thumb-nut L, adapted to engage the side of the hopper. The lower end of conveyer-belt I is arranged a short distance above the conveyer-belt C, which distance, as well as the vertical inclination of the conveyer-belt I, may be varied by swinging frame G forward or backward along the slot K. Shaft D is provided with a driving-pulley M, which may be driven from a pulley on the shaft on the thrashing-cylinder or any other suitable source of power. Shaft D is also provided with sprocket-wheel N, which is connected with a sprocket-wheel O, mounted on shaft F, by means of a chain belt P.

Arranged opposite the upper end of conveyer-belt I is a beater R, which is driven from shaft F by means of a belt S. Arranged behind and below the conveyer-belt I is a series of fingers T, projecting inwardly from a bar U, which is adjustably secured to the sides of the hopper. The fingers T are inclined inward and downward toward the conveyer-belts C and I, and their purpose is to receive the material from the conveyer-belt I and to deliver it to the conveyer-belt C, and they also serve the additional purpose of intercepting and disintegrating any large bodies of material on the conveyer-belt C.

Extending across the hopper above the rear end of conveyer-belt C and below the fingers T is a beater V. The conveyer-belts C and I and the beaters R and V move in the directions indicated by the arrows adjacent thereto, beater V being driven by means of the chain belt P, which engages the sprocket-wheel X on the beater-shaft.

In operation, the feeder having been adjusted to the throat of the clover-hulling machine, the clover or like material being thrown into the hopper A falls upon the conveyer-belt C and is carried backward toward the rear end of the hopper by said belt until it comes in contact with the conveyer-belt I, which seizes the upper portion of the mass, lifting and disintegrating it, but allowing a portion to pass between the lower end of the belt I and belt C, which portion is discharged at the back end of the belt C onto the bottom W of the hopper and is then drawn forward by the lower side of belt C and delivered in a stream of uniform thickness to the thrashing-cylinder B. That portion of the mass of clover which is detained and lifted by the conveyer-belt I is partly disintegrated, and, falling backward and downward, is carried backward on the belt C, while the remainder, passing over shaft F, falls upon the fingers T and is delivered to the belt C beyond belt I. Should any large masses of material pass under the free end of frame G and belt I, they are intercepted and held by the ends of fingers T until they are reduced by the forward movement of belt C. Beater V is for the purpose of preventing an accumulation of material on the lower ends of fingers T and at the rear end of conveyer-belt C. The free end of frame G, carrying belt I, is raised or lowered, so as to allow a greater or less amount of material, according to its condition, to pass directly backward on belt C. The lower ends of fingers T may also be raised or lowered by moving bar U inward or outward.

I claim as my invention—

1. In a feeder for clover-hulling machines, the combination, with the thrashing-cylinder of the clover-huller, of the hopper having a closed bottom, the horizontal conveyer-belt arranged beneath the mouth of the hopper and above its closed bottom, so as to form communicating conduits for the clover above and below said conveyer-belt, distributing mechanism arranged above the conveyer-belt, and suitable driving mechanism, whereby the clover on entering the hopper is first drawn away from the thrashing-cylinder and evenly distributed and is then by the same conveyer-belt carried forward to the thrashing-cylinder, substantially as set forth.

2. In a feeder for clover-hulling machines, the combination, with the hopper, the horizontal conveyer-belt, and the inclined swinging conveyer-belt, of the bar U, arranged between said belts and provided with fingers T, all substantially as and for the purpose set forth.

3. The above-described feeder for clover-hulling machines, consisting of the hopper, the horizontal conveyer-belt and the inclined swinging conveyer-belt mounted in said hopper, means, substantially as shown and described, for driving said belts, the series of fingers arranged between the belts, and the beaters R and V, all combined and arranged to co-operate substantially as set forth.

ALFRED B. REEVES.

Witnesses:
CHAS. S. WAY,
J. E. COLEMAN.